(12) United States Patent
Boyd et al.

(10) Patent No.: US 11,392,951 B2
(45) Date of Patent: Jul. 19, 2022

(54) SYSTEM AND METHOD OF DISAMBIGUATION IN PROCESSES OF BIOMETRIC IDENTIFICATION

(71) Applicant: The Government of the United States of America, as represented by the Secretary of Homeland Security, Washington, DC (US)

(72) Inventors: Daniel Boyd, Arlington, VA (US); Arun Vemury, North Bethesda, MD (US)

(73) Assignee: The Government of the United States of America, as represented by the Secretary of Homeland Security, Washington, DC (US)

( * ) Notice: Subject to any disclaimer, the term of this patent is extended or adjusted under 35 U.S.C. 154(b) by 0 days.

(21) Appl. No.: 17/478,552

(22) Filed: Sep. 17, 2021

(65) Prior Publication Data

US 2022/0005049 A1    Jan. 6, 2022

Related U.S. Application Data

(63) Continuation of application No. 16/595,095, filed on Oct. 7, 2019, now Pat. No. 11,127,013.

(Continued)

(51) Int. Cl.
*G06Q 20/40* (2012.01)
*G06F 21/32* (2013.01)
(Continued)

(52) U.S. Cl.
CPC ....... *G06Q 20/40145* (2013.01); *G06F 16/22* (2019.01); *G06F 21/32* (2013.01); *G06K 19/06037* (2013.01); *G06Q 50/265* (2013.01)

(58) Field of Classification Search
CPC ........ G06Q 20/40; G06Q 50/26; G06F 21/32; G06F 16/22; G06K 19/06
See application file for complete search history.

(56) References Cited

U.S. PATENT DOCUMENTS 6,085,976 A    7/2000 Seher
7,689,834 B2    3/2010 Igarashi
(Continued)

FOREIGN PATENT DOCUMENTS

WO    2005024732 A1    3/2005

OTHER PUBLICATIONS

Prosecution of U.S. Appl. No. 16/363,474 (US Patent Application Publication 2019/0220943), first named inventor Arun Vemury.
(Continued)

*Primary Examiner* — Scott S Trotter
(74) *Attorney, Agent, or Firm* — Lavanya Ratnam; Robert W. Busby; William Washington

(57) ABSTRACT

Systems and methods and an example method including storing, in an access control memory of an access control computer system a set of access control identity records, receiving from an individual a proffered biographic information, and comparing the proffered biographic information to the access control identity records. In response to the comparing indicating a subset of than one access control identity records having biographic information having similarity to the proffered biographic information exceeding a threshold, generating and sending to a central resource computer system a biometric comparison request. The request includes the proffered biographic information of the persons, an indication of the biometric information of the person, and indication of biographic information in the identity records in the subset. A response is received from the central resource computer indicating whether a central (Continued)

resource identity record includes both a matching identity record biographic information and a matching identity record biometric information.

20 Claims, 6 Drawing Sheets

Related U.S. Application Data

(60) Provisional application No. 62/741,869, filed on Oct. 5, 2018.

(51) Int. Cl.
  *G06K 19/06* (2006.01)
  *G06F 16/22* (2019.01)
  *G06Q 50/26* (2012.01)

(56) References Cited

U.S. PATENT DOCUMENTS

| | | | |
|---|---|---|---|
| 8,392,721 | B2 | 3/2013 | Kaleedhass et al. |
| 8,533,485 | B1 | 9/2013 | Bansal et al. |
| 8,677,139 | B1 | 3/2014 | Kalocsai |
| 8,823,497 | B2 | 9/2014 | Hutzler et al. |
| 8,866,586 | B2 | 10/2014 | Hayashi |
| 9,560,165 | B2 | 1/2017 | Liu et al. |
| 10,055,733 | B2 | 8/2018 | Hanna |
| 10,097,545 | B2 | 10/2018 | Cartaya |
| 10,296,778 | B2 | 5/2019 | Cuti et al. |
| 10,528,716 | B2 | 1/2020 | Cornick et al. |
| 10,650,545 | B2 | 5/2020 | Fisher et al. |
| 10,922,631 | B1 | 2/2021 | Shahidzadeh |
| 2005/0167484 | A1 | 8/2005 | Sussman |
| 2006/0055512 | A1 | 3/2006 | Chew |
| 2006/0293892 | A1 | 12/2006 | Pathuel |
| 2007/0036395 | A1 | 2/2007 | Okun |
| 2008/0302870 | A1 | 12/2008 | Berini et al. |
| 2010/0138246 | A1 | 6/2010 | Carey et al. |
| 2011/0035371 | A1 | 2/2011 | Pong et al. |
| 2011/0087888 | A1 | 4/2011 | Rennie |
| 2011/0211735 | A1 | 9/2011 | Langley |
| 2011/0231911 | A1 | 9/2011 | White et al. |
| 2012/0036071 | A1 | 2/2012 | Fulton et al. |
| 2012/0159600 | A1 | 6/2012 | Takagi |
| 2013/0212655 | A1 | 8/2013 | Hoyos et al. |
| 2013/0262305 | A1 | 10/2013 | Jones et al. |
| 2013/0324086 | A1 | 12/2013 | Celi, Jr. et al. |
| 2014/0100895 | A1 | 4/2014 | Chen |
| 2014/0279640 | A1 | 9/2014 | Moreno et al. |
| 2014/0313007 | A1 | 10/2014 | Harding |
| 2014/0363058 | A1 | 12/2014 | Emmett et al. |
| 2015/0063657 | A1 | 3/2015 | Poder et al. |
| 2017/0372541 | A1 | 12/2017 | Attar |
| 2018/0225662 | A1 | 8/2018 | Sibert et al. |
| 2019/0043148 | A1 | 2/2019 | Vemury |
| 2019/0251571 | A1 | 8/2019 | O'Reilly et al. |
| 2020/0213301 | A1 | 7/2020 | Wisniewski |
| 2020/0334834 | A1 | 10/2020 | Fisher |
| 2021/0057061 | A1 | 2/2021 | Bass et al. |

OTHER PUBLICATIONS

Prosecution of U.S. Appl. No. 16/366,584 (US Patent Application Publication 2019/0220944), first named inventor Arun Vemury.
Prosecution of U.S. Appl. No. 16/150,690 (US Patent Application Publication 2019/0043148), first named inventor Arun Vemury.
Prosecution of U.S. Appl. No. 16/594,891, first named inventor Daniel Boyd.
Prosecution of U.S. Appl. No. 16/848,470, first named inventor Daniel Boyd.
Yosecution of U.S. Appl. No. 15/223,172 (US Patent Application Publication 2017/0032485), first named inventor Arun Vemury.
Otto, Nate et al., Verifiable Credentials Use Cases, W3C Working Group Note Sep. 24, 2019, https://www.w3.org/TR/2019/NOTE-vc-use-cases-20190924.

SYSTEM AND METHOD OF DISAMBIGUATION IN PROCESSES OF BIOMETRIC IDENTIFICATION

CROSS-REFERENCE

This application is a continuation of and claims the benefit under 35 U.S.C. § 120 to U.S. Non-Provisional patent application Ser. No. 16/595,095 filed Oct. 7, 2019, now U.S. Pat. No. 11,127,013, entitled "SYSTEM AND METHOD FOR DISAMBIGUATED BIOMETRIC IDENTIFICATION," which claims the benefit under 35 U.S.C. § 119(e) to U.S. Provisional Patent Application No. 62/741,869, filed Oct. 5, 2018 entitled "System and Method for Biometric Identification," the disclosures of all of which are incorporated by reference in their entireties.

This application is related to U.S. patent application Ser. No. 16/594,891 filed Oct. 7, 2019, which is hereby incorporated by reference in its entirety.

STATEMENT OF GOVERNMENT INTEREST

This invention was made with United States Government support. The Government has certain rights in this invention.

FIELD OF DISCLOSURE

This disclosure relates generally to checking the identity of a subject at a checkpoint

BACKGROUND

Using biometric information to verify the identity of a subject at a checkpoint is an extremely expensive function, from a computational viewpoint. The computer system that performs such a function consumes vast amounts of computing resources including, for example, memory, processor cycles, network usage, and time. Highly desirable is a way to improve the inner workings of a computer itself to improve computing resource use when using biometric information.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

For a method for reduced network and processing burden, in biographic disambiguation in access control, an implementation can include storing, in an access control memory of a computer system of an access control checkpoint, a set of access control identity records, the access control identity records including biographic information. The implementation can include, responsive to receiving a biometric information of a person and, associated with the biometric information of the person, a proffered biographic information of the person: accessing the access control memory, and comparing the proffered biographic information to the access control identity records. The implementation can include, in response to a result of the comparing indicating a subset of more than one of the access control identity records having biographic information having a degree of similarity to the proffered biographic information that exceeds a threshold: generating and sending, via a network, to a central resource computer system, a biometric comparison request message that includes the proffered biographic information of the person, an indication of the biometric information of the person, and an indication of biographic information in the access control identity records in the subset, receiving from the central resource computer system a response to the biometric comparison request message, the response indicating whether a central resource identity record includes both a matching identity record biographic information and a matching identity record biometric information, the matching identity record biographic information matching any among the proffered biographic information and biographic information indicated by the indication of biographic information in the access control identity records in the subset, and the matching identity record biometric information matching the biometric information indicated by the indication of biometric information in the biometric comparison request message.

For a computer system for reduced network and processing burden biographic disambiguation, an implementation can include an access control checkpoint computer system, of an access control checkpoint, comprising a hardware processor, an access control memory, and a communication unit, adapted to communicate via a network with a central resource computer system. The access control checkpoint computer system can further comprise the hardware processor being configured to access the access control memory and to perform a predefined set of basic operations by loading corresponding ones of a predefined native instruction set of codes, the predefined native instruction set of codes, constituting a set of instructions selectable for execution by the hardware processor. The implementation can include biometric-credential authentication technology system, stored in the access control memory, comprising a respective sequence of instructions selected from the predefined native instruction set of codes of the hardware processor, adapted to: manage, in the access control memory, a set of access control identity records, the access control identity records including biographic information. The biometric-credential authentication technology system can, responsive to receiving a biometric information of a person and a proffered biographic information of the person, proceed to access the access control memory, and compare the proffered biographic information to the access control identity records. The biometric-credential authentication technology system, response to a result of the compare indicating a subset of more than one of the access control identity records having biographic information having a degree of similarity to the proffered biographic information that exceeds a threshold, can generate and send, via the network, to the central resource computer system, a biometric comparison request message that includes the proffered biographic information of the person, an indication of the biometric information of the person, and an indication of biographic information in the access control identity records in the subset, receive from the central resource computer system, via the network, an indication of whether a central resource identity record includes both a matching identity record biographic information and a matching identity record biometric information, the matching identity record biographic information matching any among the proffered biographic information and biographic information indicated by the indication of biographic information in the access control identity records in the subset, and the matching identity record biometric information matching the biometric information indicated by the indication of biometric information in the biometric comparison request message.

For a computerized method for reduced computational burden disambiguation, an implementation can include storing in a memory of a computer system of an access control checkpoint, a set of biographic information identity records, having respective saved biographic information; receiving, from an individual at the access control checkpoint a proffered biographic information; and comparing the proffered biographic information to the respective saved biographic information in the set of biographic information identity records, and generating a comparison result. The implementation can include selecting, as a selected next operation, among a first next operation, a second next operations, and a third next operation, based on the comparison result. The implementation can include the first next operation being a determination of no match, the second next operations being a biometric matching against a prior biometric information corresponding to one person, and the third next operation being a biographic disambiguation. In the implementation, the selecting can include selecting the first next operations in response to the comparison result indicating the proffered biographic information matches no saved biometric information, selecting the second next operation in response to the comparison result indicating the proffered biographic information matches only one saved biometric information with a degree of similarity exceeding a threshold, and selecting the third next operation in response to the comparison result indicating the proffered biographic information matches more than one saved biographic information with a degree exceeding the threshold. The implementation can include performing the selected next operation; and repeating the receiving, comparing, selecting, and performing until all among the first next operations, second next operation, and third next operation have been selected and performed.

The detailed description below teaches, by example, how to improve computing resource use when using biometric information to verify the identity of a subject at a checkpoint. Notwithstanding the preceding sentence, the scope of the invention is to be determined by only the appended claims. The improvement in computing resource use is a requirement only to the extent it is affirmatively stated in the claims.

BRIEF DESCRIPTION OF THE DRAWINGS

The attached drawings help explain the embodiments described below.

DETAILED DESCRIPTION

Computer Systems

Figure 1:
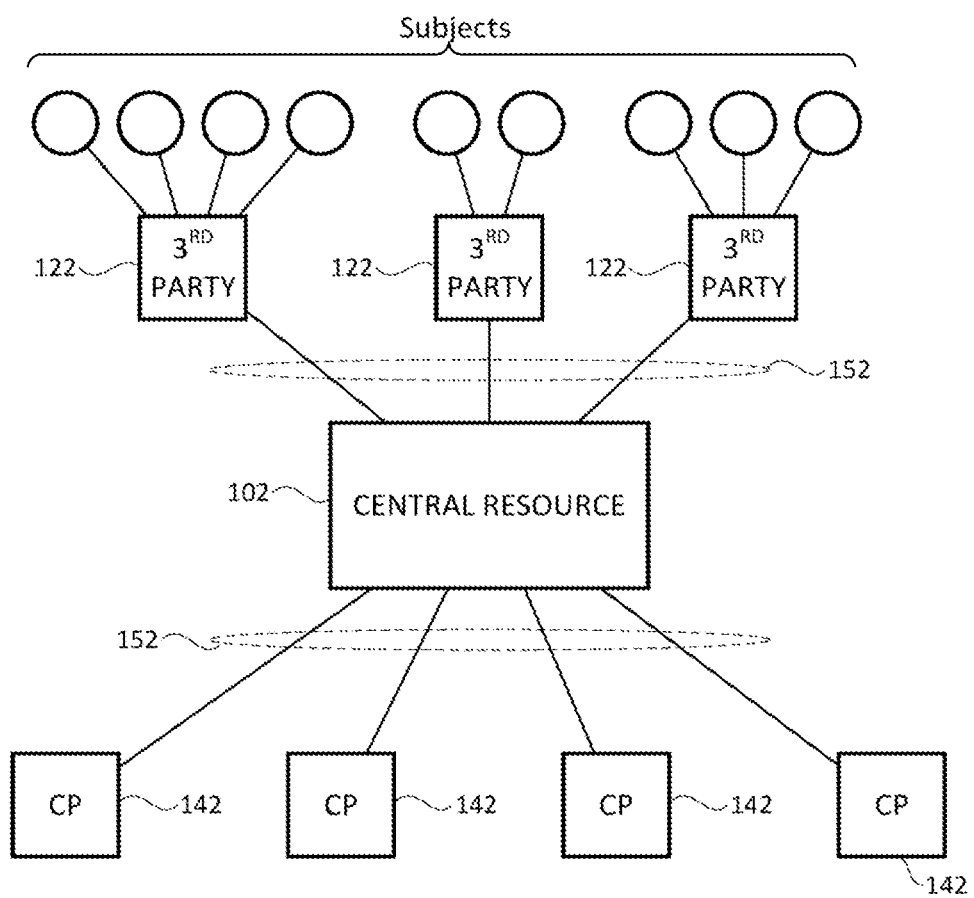
FIG. 1 shows an example computer system where a central resource interacts with checkpoints, and receives communications from third-party computer systems, in accordance with an example embodiment.

One embodiment resides in a computer system. Here, the term computer system includes at least a processing system and a memory accessible to the processing system. The processing system includes at least one hardware processor, and in other examples includes multiple processors and/or multiple processor cores. The processing system in yet another example includes processors from different devices working together. In embodiments, a computer system includes multiple processing systems that communicate cooperatively over a computer network.

Hardware Processors

A hardware processor is a complex electronic circuit designed to respond to certain electronic inputs in a predefined manner.

The inputs to a hardware processor are stored as electrical charges. Each such electrical charge is typically stored by a respective memory circuit (also referred to as memory) such as in a register, in a random-access memory, on a hard drive or SSD, or the like, that is adapted to store a binary value. Such a memory circuit, in one example, includes a transistor and a capacitor. Of these two components, the capacitor can hold a charge. The hardware processor interprets the electrical charge of a given memory circuit as being in one of two permitted states. The two permitted states correspond to the two values of the binary number system, namely, zero (0) or one (1). In other words, a hardware processor is designed to respond to inputs that have binary values.

Hardware processors accept the input of binary values in sets. An eight-bit hardware processor accepts an input of eight binary values (eight binary digits, or bits) at a time. These eight binary values are provided as an ordered set. In an ordered set, the order of the values matters. A set of eight binary values offers only 118 different permutations. Thus, with an eight-bit hardware processor, there are only 118 different sets of ordered binary values that can be input.

Native Instruction Set

A given eight-bit hardware processor has electrical circuitry designed to perform certain predefined operations in response to certain sets of the 118 possible sets of ordered binary values. The circuitry is built of electronic circuits arranged or configured to respond to one set of ordered binary values one way and to another set of ordinary values another way, all in accordance with the hardware design of the particular hardware processor. A given set of ordered binary values to which the hardware processor is designed to respond, in a predefined manner, is an instruction. An instruction is also referred to as a machine code or, more simply, a code. The collection of valid sets of ordered binary values (i.e., instructions/codes), to which a given hardware processor is designed to respond, in a predetermined manner, is the native instruction set of the processor, also referred to as a native instruction set of codes.

The electronic circuits of a hardware processor are arranged or configured to respond to inputs in accordance with the hardware processor's precise processor design. This processor design is fixed when the hardware processor is manufactured. In some technologies, although the electronic circuits are all arranged at manufacture, a portion of the circuits is arranged to accommodate a later step that fixes this portion's function for subsequent use. In other words, some technologies allow the precise processor design to be fixed at a later step. Whether the hardware processor's particular design is fixed at manufacture or fixed at a later fixing step, the hardware processor responds to valid inputs by performing predefined operations in accordance with its particular design.

Hardware processors made by different manufacturers can and typically do respond differently to a given code. Each hardware processor line has its own native instruction set. To control a given hardware processor, it is necessary to select an instruction or a sequence of instructions from the predefined native instruction set of that hardware processor. Providing an input that does not correspond to one of the predefined native instruction set of codes, in embodiments, results in an invalid operation or an error.

Modern hardware processors are sixty-four-bit hardware processors. These accept sixty-four binary values at a time. A sixty-four-bit machine allows for more than nine quintillion permutations in the set of ordered binary values. Even so, such hardware processors have respective native instruction sets of codes to which they respond in a predetermined manner.

Basic and Complex Operations

Each code selected from a given native instruction set corresponds to a basic operation of a hardware processor. To achieve more complex operations, it is necessary to select multiple codes and to execute them in a predetermined sequence.

When such codes are loaded into a hardware processor in a sequence, the hardware processor performs the basic operations to which the codes correspond, in the sequence loaded. This is also referred to as executing the instructions to which the codes correspond.

When the hardware processor loads a sequence of codes, selected from the predefined native instruction set of codes, the result is a sequence of basic operations that, taken together, constitute a complex operation.

Logic

The sequence of codes that are to be loaded and executed is stored in a memory; the hardware processor is designed with storage for some codes but not enough space for longer sequences of codes. The memory that stores the sequence of codes must be accessible to the hardware processor, directly or indirectly. The sequence of codes that a hardware processor is to execute, in the implementation of a given task, is referred to herein as logic. The logic is made up, therefore, of a sequence of codes or instructions, selected from the predefined native instruction set of codes of the hardware processor, and stored in the memory.

Logic and Resource Expenditure

Logic is part of the inner workings of a computer system. As such, the logic determines, to a large extent, the amount of computing resources a computer system will expend. One such resource is referred to as central processing unit (CPU) cycles. A CPU cycle refers, herein, to loading a code and subsequently performing the corresponding predefined operation that is hardwired into the hardware processor. One CPU cycle follows another with the loading of the next code to execute. Logic that requires extensive computations causes the hardware processor to carry out a proportionally large number of operations and expends many CPU cycles.

Logic that involves obtaining, loading, processing, and unloading an extensive amount of data files causes the hardware processor to carry out a proportionally large number of operations and, likewise, causes the memory to store and to re-store a proportionally large amount of data. Similarly, when logic involves retrieving data from across a network, the more data retrieved increases the level of computer network use, especially in the case of large data files such as those related to biometric data.

Software

Logic, as used herein, does not mean software. Software refers to higher-level, human-readable source code. Source code is written in a programming language that programmers use to express operations they would have a computer perform. Source code, however, cannot be executed by a hardware processor because source code instructions are not selected from the predefined native instruction set of codes. Before source code can be used on a given hardware processor, it must be converted into logic, also referred to as being converted into machine instructions.

The process of making source code executable by a hardware processor, a process known to those familiar with this technical field as compilation or interpretation, is not the subject of this application and is well known in the field, and therefore not described in any detail here. The logic describe d below refers to a particular sequence of machine instructions or codes selected from the predefined native instruction set of codes of a hardware processor.

User Interface and Controller

A computer system, in embodiments, also includes a user interface controller. A user interface controller controls circuitry that presents a user interface. A user interface is any hardware or combination of hardware and logic that allows a user to interact with a computer system. For this discussion, a user interface includes one or more user interface objects. User interface objects include display regions, user activatable regions, and the like. In embodiments, the user interface controller also controls circuitry that locks or unlocks various barriers such as turnstiles, gates, or doors. Such barriers are referred to in this context as access controls.

A display region is a region of a user interface which displays information to the user. A user activatable region is a region of a user interface, such as a button or a menu, which allows the user to take some action, or an input area that accepts a manual input from a user. A display region and a user activatable region are, in some examples, collocated, overlapping, or reside one within the other.

The user interface is under the control of the user interface controller. The user interface controller interfaces with the user interface to output information to the user and to receive inputs from the user. The user interface controller is under the control of the processing system.

Example Context

As a teaching example, this discussion employs the context of airline travel. The reader should understand that the description below applies equally in other contexts.

To ensure the safety and security of airline passengers, airplane crews, and numerous other people and structures, authorities operate entrance checkpoints at airports. The subjects include airline passengers and their things. The functional set for each subject in this context includes the subject's luggage, personal items, and the person of the subject.

Focus

Of relevance to the discussion is the how such checkpoints carry out the mission of verifying the identity of a subject (person) who presents themselves as a passenger or the like.

Information Used to Verify Identity

This discussion sets up two broad categories of information about people: biographic information and biometric information. These categories are explained more fully by way of example, below. In general, however, and without limitation, biographic information is data about a person such as name, address, and date of birth, whereas biometric information is data about a person's physical self and includes fingerprints, photographs, iris scans, voice, gait, and the like.

Biographic Information

Biographic information is information about a person. Biographic information is usually character-based, meaning that the data represents actual letters or numbers and not data that represents an image.

This discussion sets up two categories of biographic information: saved biographic information and proffered biographic information. The former refers to biographic information that is already stored in an information system or file prior to when a person arrives at a checkpoint. The latter refers to the biographic information that a person supplies when at a checkpoint.

Saved Biographic Information

Beginning with birth, authorities accumulate biographic information about people. This includes information about a person's date and place of birth, their parents, their citizenship, identifying marks, their national ID number, their passport number, their social security number, and the like. As people mature and live their lives, various authorities save and store other biographic information such as tax records, voter registration records, service records, criminal records, graduation records, and licensure records, to name just a few.

Proffered Biographic Information

Proffer means hold out something to someone for acceptance. Depending on what a person is doing, and in embodiments, a person frequently gives biographic information about themselves to pass through a checkpoint. At a checkpoint, a subject proffers such biographic information. For example, in the context of air travel, a person must proffer certain biographic information to an airline to buy passage on an airplane. Here, the proffered biographic information includes, for example, first name, last name, date of birth, address, and the like. In the context of motor vehicle travel, a person must proffer biographical information to obtain a driver's license, to license a vehicle, and to purchase insurance.

The person, in embodiments, "holds out" the proffered biographic information by speaking the information out loud, typing the information, showing a document, supplying a credential, showing a document displayed on a personal electronic device, providing a credential electronically kept in the personal electronic device, by placing a personal electronic device within proximity of a sensor, or the like.

A frequent checkpoint function is to establish a person's identity. This usually involves the use of biographic information.

One approach, to establishing a person's identity, is to compare the proffered biographic information of a person with some saved biographic information. Depending on the mission of the checkpoint, this comparison or analysis of proffered biographic information to saved biographic information is sometimes acceptable—it might suffice given the typical consequences foreseeable when the analysis results in a wrong conclusion.

For example, consider the context of checking into a hotel. The hotel's front desk is the checkpoint a person must pass to become a hotel guest. The front desk attendant is a human operator of checkpoint. This attendant must admit, as a guest, only people who have reservations. The hotel reservation contains certain saved biographic information about the expected guest. The person at the hotel front desk proffers a driver's license or passport to establish that they, the person, have a reservation. The driver's license in this context is the proffered biographic information. The front desk attendant compares the proffered biographic information with the saved biographic information.

Biographic Information Analysis

The biographic analysis by the front desk attendant is trivial when the proffered biographic information perfectly matches the saved biographic information. The biographic analysis is not always trivial. People make mistakes such as typographical errors when they sign up for reservations (i.e., the saved biographic information can have errors). People also substitute alternative information when they sign up for reservations, such as entering a nickname instead of a name as it appears on the driver's license (i.e., the saved biographic information can have anomalies). Moreover, biographic information is often not unique. Sometimes, different people have identical names.

It is often the case, when performing a biographic comparison or analysis, that even though the saved biographic information and the proffered biographic information do not match identically, the degree of similarity between the two is sufficient to satisfy the checkpoint mission. In the context of the front desk attendant and the person, the degree of similarity between the saved biographic information and the proffered biographic information can have a threshold, for acceptance of the person as a hotel guest, that is relatively low compared with a threshold that is appropriate for other contexts. An example where the threshold for the degree of similarity ought to be higher is the context of a checkpoint at a bank where a teller is charged with handing over money only to account owners.

The calculation of a degree of similarity between saved biographic information and proffered biographic information, in embodiments, is performed by an automated process. One example of such a process is described in United States Published Patent Application 2011/0035371 (document RI, hereafter). The following specific portions of document RI are incorporated herein, by this reference, for their helpful example of a data comparison system that calculates a degree of biometric information similarity: paragraphs [0004], [0022], [0024]-[0067], and the drawing figures mentioned in these paragraphs.

Biographic Information Limitations

The utility of verifying the identity of people using biographic information has limitations. One limitation is where people give false biographic information, also referred to below as a false information problem. For example, in the context of airline travel, a further checkpoint mission (in addition to checking for reservations) can be to prevent people who are identified on a watchlist (i.e., watchlist members) from being admitted as passengers. Such a watchlist can include, for example, people who are fugitives from the law.

People who know they are on such a watchlist, but still want to travel as airline passengers, sometimes disguise their actual identities and pretend to be someone else, i.e., they lie about who they are. When a person lies about who they are, their proffered biographic information contains false information. Such false proffered biographic information might match equally false, saved biographic information provided by the watchlist member at the time of making the reservation. Here, checking the proffered biographic information against the saved biographic information, alone, is insufficient to fulfill the mission of preventing watchlist members from being able to travel by air.

The foregoing context of the watchlist is one example where the false information problem arises. To solve the false information problem, authorities take measures beyond the simple checking of proffered biographic information against saved biographic information. Such further measures include, in embodiments, the use of biometric information.

Biometric Information

As previously mentioned, biometric information is data about a person's physical self and includes fingerprints, photographs, iris scans, voice, gait, and the like. Biometric information helps handle the false information problem because it is information about a person that is harder to falsify.

In example embodiments described below, biometric information, when used, is obtained before checkpoint arrival and then when at the checkpoint. The type of biometric information varies in embodiments.

Prior Biometric Information

Before arriving at the checkpoint, and, more typically, a long time before arriving at the checkpoint, the person seeks a credential or an identification (ID) token suitable to the person's purpose in passing through the checkpoint, and suitable to the authorities who implement the checkpoint. In embodiments, the credential includes biometric information.

A government-issued photo ID (GPID) is an example of such a credential. GPID's that are well-known in the United States include passports (issued by the national government) and driver licenses (issued by state governments). Other, similar credentials include student IDs issued by universities, work IDs issued by private companies, annual passes issued by certain parks, and member IDs issued by certain stores. In the context of airline travel, the use of a GPID is assumed for the rest of the discussion below, although other credentials and other types of credentials are equally valid in embodiments.

As an alternative to the ID card-type credential, the discussion below also contemplates virtual credentials stored on personal devices such as mobile phones or the like. One implementation of such a system, among others, is described in United States Patent Application Publication 2018/0225662 (document R2 hereafter). The specific portions of document R2 mentioned hereafter are incorporated in this description, by reference, for their helpful background information regarding protecting a representation of an identification document on a mobile device: paragraphs [0018]-[0051], [0054], and [0058]-[0060], and the drawing figures mentioned in these paragraphs.

The biometric information obtained as part of a credentialing process is referred to herein as prior biometric information. This term is also used to include the more general case in which biometric information is obtained, previously, for some purpose that is not strictly part of a credentialing process. Prior biometric information includes, for example, fingerprint or other biometric information obtained from a person as part of a process that is not solely to obtain a credential but, instead, is obtained to gain a security clearance, to pass immigration, to become a member of the armed forces, or the like.

Current Biometric Information

Biometric information includes not only the prior biometric information, but also biometric information obtained when the person is at the checkpoint. The biometric information obtained when the person is at the checkpoint is referred to as current biometric information. Current biometric information is obtained from the person using various sensors such as cameras, scanners, readers, analyzers, and the like.

Challenges in Biometric Information Use

One challenge posed by using biometric information, however, arises from its greater resource usage. Biometric information is extremely large, in terms of data, compared with biographic information.

For example, assume that some biographic information includes a name field of fifty characters, an address field of two hundred characters, a social security or passport number field of up to twenty-five characters, and a trusted traveler number of up to twenty-five characters. The total data space is then as much as three hundred characters. This equates to about three hundred bytes. A moderate-resolution photograph taken by today's personal devices is typically six megabytes, or about six million bytes. This difference exceeds four orders of magnitude. In other words, biometric information for a given person is often ten thousand times larger than comparable biographic information for the same person, when stored on a computer system.

Another challenge is that biometric information is harder to compare than biographic information. Comparing biographic information is simply a matter of comparing character data with character data. Such a comparison can be accomplished with relatively few CPU cycles. For example, comparing a first name in saved biographic information with the first name in proffered biographic information requires only a simple character-by-character analysis. The analysis is simple because the base data, the name or birthdate, for example, is itself discrete and can be precisely and perfectly represented by digital data. The characters themselves are represented with mathematical precision in ASCII, ANSI, Unicode, or the like. The analysis requires only a few CPU cycles to carry out the analysis.

Comparing biometric information is harder. Biometric information, and especially image-based biometric information, is captured as a digital approximation of a physical, analog feature. There is no perfectly precise way to capture a person's face: faces change from time to time, especially due to facial hair and makeup; faces have many expressions and moving parts such as eyes, eyebrows, smiles, wrinkles, and teeth; faces appear differently under different lighting conditions with poor lighting obscuring some features and overexposure obscuring others; and faces are captured against scenes that certainly differ between the time of capture of the prior biometric information and the time of capture of the current biometric information.

Although the comparison of biometric information is hard, many techniques for performing it are known. One implementation suitable for use in calculating a degree of similarity between prior biometric information and current biometric information is described in United States Patent Application Publication 2019/0251571 (document R3 hereafter). The specific portions of document R3 mentioned hereafter are incorporated by reference, in this description, for their helpful background information regarding how to calculate a degree or measure of similarity between prior biometric information and current biometric information: paragraphs [0013]-[0014], [0016], and [0053]-[0130], and the drawing figures mentioned in these paragraphs.

Transformed Biometric Information

Some techniques to compare biometric information involve a preliminary step that employs a transform function. A transform function changes a digital input into a corresponding digital output. The digital output of the transform function does not look like the digital input. For example, a transform function into which a digital picture of a face is input transforms it into data that appears to be only digital noise. Transforming biometric information results in a digital output that cannot be recognized as biometric information. Ideally, the transformation preserves all relevant data from the biometric information, albeit in an altered state.

A one-way transform function is a transform function that, for most practical purposes, is not invertible. In other words, it is so computationally expensive to convert the already-transformed digital output back into the original input that the original transformation is essentially irreversible. The output of a one-way transform of biometric information can still be used to perform biometric comparisons between prior biometric information and current biometric information providing that the same transform is used for both.

In this discussion, when a transform function is performed on biometric information and the result does not look like the original when rendered, then the result is referred to as transformed biographic information. When the result is also not invertible, the result is referred to as permanently-transformed biographic information.

Privacy benefits from using permanently-transformed biometric information (see operating example C, below). For example, assume a merchant stores customer pictures along with corresponding biographic information. If this information is breached by a malefactor, the biographic information of each person and their actual image is stolen. If, instead, the merchant had stored only permanently-transformed biometric information, then the malefactor would not have the biometric information at all, and the malefactor would have been prevented from being able to reconstitute the original biometric information.

Improving the Computer Systems that Support Checkpoints

Therefore, in embodiments, the checkpoint accesses or otherwise obtains prior biometric information pertaining to the person at the checkpoint. The checkpoint collects current biometric information from the person themselves. A biometric comparison is made between the prior biometric information and the current biometric information. When the comparison is in the affirmative, at least to a required degree, the person at the checkpoint is accepted as having proven their identity.

In embodiments, the checkpoint functions include both a biographic comparison and a biometric comparison. The biographic comparison or analysis is between the proffered biographic information and the saved biographic information. The biometric comparison or analysis is between the current biometric information and the prior biometric information.

In example embodiments below, a system performs biographic disambiguation before turning to biometric information. Biographic disambiguation, in general, means to reduce the universe of records to a subset of possible matches by comparing the proffered biographic information with saved biographic information. The biographic disambiguation reduces the amount of biometric information that must be considered because the biometric information for only the subset of possible matches need be considered (see operating example D, below). This substantially improves the operation of the computer system itself because the relatively expensive biometric comparison is performed on fewer records, leading to a lower expenditure of computing resources.

Moreover, in embodiments, the biometric information comparison is shunted from the checkpoint lanes to a checkpoint central resource that has ample computing resources (see operating example B, below). The load in these embodiments does not have to be borne by the equipment at the checkpoint. The amount of biometric information that must be transported is also reduced, realizing a further conservation of computing resources. In other words, compared with known computer systems using known logic, a computer system implemented in accordance with the examples below, using logic that includes codes selected from the native instruction set of codes for a particular hardware processor and configured like the examples below, realizes an improvement in the functioning of the computer system itself, the improvement being technological in nature and reflected in an important decrease in the use of computing resources.

In other example embodiments, an improvement in the functioning of the computer system itself resides in a reduction of the use of computing resources by providing to each checkpoint a respective expected subject list. An expected subject list is a list of people who are expected to pass through a given checkpoint. In the example of a hotel front desk, the attendant has a daily list of all guests expected to arrive at that hotel. In the example of air travel, a checkpoint has a list of all travelers expected to travel at that airport. The expected subject list shrinks the search space that is queried when a person reaches the checkpoint. The checkpoint need not look for matches to the proffered biographic information from every possible record of every subject. In an embodiment, the checkpoint looks instead to only the records of subjects on the expected subject list. This improves system performance by reducing the computer resources expended during the search, and by not spending computer resources on comparing records of people who are not expected.

In other example embodiments, an improvement in the functioning of the computer system itself resides in a rolling update to the expected subject list (see operating example A, below). An expected subject list in some embodiments is generated at a predetermined time in advance of need. In the example of the hotel front desk, the list is generated the day before. Once generated, the expected subject list in some implementations is static. The hotel front desk prints the list, for example, and no updates are made to it. Where rolling updates are used, however, the list updates in real time or on some frequent basis. In the example of air travel, the expected subject list updates frequently, driven by changes such as canceled trips, canceled flights, changed connections, and the like. This improves system performance by focusing computer resources on records in the most up-to-date expected subject list.

In yet other example embodiments, an improvement in the functioning of the computer system itself resides in locking the records of subjects when the identity of a subject is fixed (see operating example E below). This not only prevents the duplicate use of the same identity by two different people, it also makes the biographic disambiguation more efficient by eliminating from the comparison any locked records, leading to a reduction in the expenditure of CPU cycles and memory.

Discussion

Returning to the context of air travel, mentioned above, FIG. 1 depicts a computing system according to an example embodiment. Third-party sources 122 (3rd Party) each serve multiple subjects. The third-party sources 122 communicate with a biometric matching resource 102 (Central Resource) via network 152. Access control checkpoints 142 (CP) also communicates with the biometric matching resource via network 152.

In this teaching example, the subjects are people who make reservations to travel by air. The third parties are individual airlines. The central resource represents a computer system of a national authority that receives reservation and traveler information from the airlines, or a collection of such computer systems. The checkpoints are individual airports. In other embodiments, the checkpoints are terminals within airports.

Figure 2:
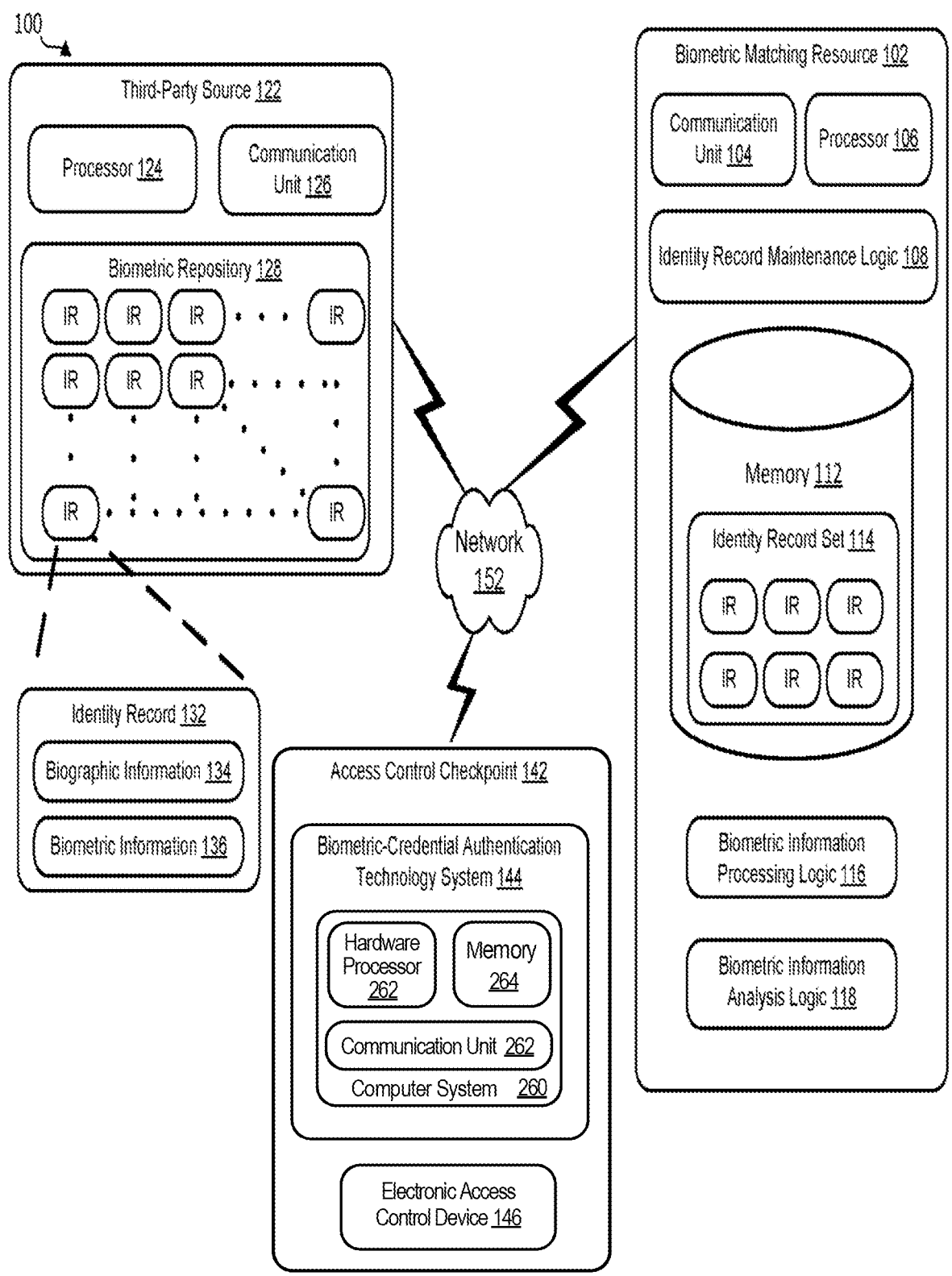
FIG. 2 shows a simplified, high-level schematic view of the computer system of FIG. 1 in accordance with an example embodiment, and also a third-party computer system, interconnected by a communications network.

Turning now to FIG. 2, system 100 indicates at least one of the third-party sources 122, and at least one access control checkpoint 142. Biometric matching resource 102 employs a communication unit 104 to communicate data via network 152 with other entities such as third-party source 122 and access control checkpoint 142. Network 152 is, in embodiments, a wireless network (e.g., cellular, the IEEE 802.11 family of standards, Wi-Fi, LTE), a wired network, or a combination thereof. The biometric matching resource 102 also includes a processing system such as a hardware processor 106, identity record maintenance logic 108, memory 112 storing an identity record set 114, biometric information processing logic 116, and biometric information analysis logic 118.

In this example embodiment, the third-party source 122 maintains detailed identity records for the subjects who make reservations for that airline and provides only relevant portions of only relevant identity records to the biometric matching resource 102.

As mentioned above, preceding biometric analysis with biographic disambiguation reduces the computing resources required for identification. Network resources and the time of the overall identification process can be further reduced by obtaining beforehand expected subject lists, that is, identity records of people expected to pass through a checkpoint within a particular window of time, such as a day. For example, the resource used for the biometric analysis can retrieve identity records from one or more third-party resources over a period well before the particular window of time during which they would be needed. Additionally, the resource may receive the biographic and biometric information of the person seeking access to a restricted area from the checkpoint along with closely matching biographic information extracted from identity records of individuals. This approach reduces the amount of data required to be transmitted between the checkpoint 142 and the biometric matching resource 102 because the biometric information 136 in the identity records 132 including the closely matching biographic information would not have to be transmitted. The biometric information 136 in the identity records 132 would already be included in identity records received by the resource from one or more third-party sources.

Returning to FIG. 2, the third-party source 122 is shown in more detail. The third-party source 122 comprises a processing system with a hardware processor 124 and a communication unit 126 for transmitting and receiving data over network 152. The third-party 122 source also contains a biometric repository 128 with detailed identity records (IR) of individuals. The individuals are subjects who are customers of the airline, in this example. Identity records (IR) 132 comprise biographic information 134 and biometric information 136. In one example embodiment, the biometric information 136 is stored as transformed biometric information. In another example embodiment, the biometric information 136 is stored as permanently-transformed biometric information. The biographic information 134 comprises, e.g., a first name, a last name, and a date of birth. In embodiments, the biometric information is facial recognition data, fingerprint data, and/or iris data. In other embodiments, the biometric information 136 is stored as a biometric template that is a digital representation of the biometric information calculated using a one-way transform function. As discussed above, the one-way transform function prevents inversion to restore the original biometric data. Storing the biometric information according to such a biometric template, after conversion using the one-way function, enhances privacy even in the event of capture of the stored information by a malevolent outsider. The biographic information 134 and biometric information for an identity record 132 of an individual are obtained, in an embodiment, from the individual by an enrollment process at the third-party source 122 or another facility. The biographic information 134 is saved biographic information. The biometric information 136 is prior biometric information.

FIG. 2 shows access control checkpoint 142 in more detail. The access control checkpoint 142 includes a computer system 260 having a hardware processor 262, memory 264, a communication unit 270, and communicates with third-party source 122 and biometric matching resource 102 via network 152. The access control checkpoint 142, in embodiments, is remote from one or more of the third-party source 122 and biometric matching resource 102. The access control checkpoint 142 comprises biometric-credential authentication technology system 144 and an electronic access control device 146. System 144, in cooperation with third-party source 122 and biometric matching resource 102, validates the identity of a person who appears at the access control checkpoint 142. Based upon the result of identification of the person, system 144 transmits a control signal to electronic access control device 146. Electronic access control device 146 responds to the control signal in accordance with its configuration.

Biometric matching resource 102 in FIG. 2, in embodiments, handles the computationally expensive task of biometric comparison or analysis. To understand the benefit of using this central resource to perform biometric comparisons, consider the distributed resource case in which the access control checkpoints 142 all perform their own biometric comparisons.

In such a case (i.e., the distributed resource case), each time one of the checkpoints needs to perform a biometric comparison between current biometric information and prior biometric information, the prior biometric information must be retrieved to the access control checkpoint 142. For example, suppose a subject claiming to be John Smith appeared at a given lane of a given checkpoint. On any given date, many John Smiths are traveling. Assume the records of three John Smiths remain in the biographically disambiguated subset of records. The biometric information for all three of these records must be brought to the given access control checkpoint 142 so that each can be compared with the current biometric information of the subject appearing at the checkpoint.

Transporting three sets of biometric information incurs a high cost in computing resources. The biometric information in each of the three records requires, for example, four megabytes to store, giving twelve megabytes total. Assuming a TCP/IP network with a maximum transmission unit of 1,500 bytes, each record's biometric information would require roughly 3,000 frames to cross the network, or close to 10,000 frames in all. The size of the biographic information, as mentioned previously, is comparatively trivial and could fit within one frame.

In the simple example shown in FIG. 1, each of the four access control checkpoints 142, at any given time, probably needs to check the biometric information for a person whose identity is to be verified. Passing the biometric information downstream to the access control checkpoint 142 in every case exacts a toll that appears quite heavy when viewed from a nationwide perspective.

Return now to the embodiment in which the central resource performs the biometric information analysis, and to the example of the subject who claims to be John Smith for which there exist three possible matches to John Smiths. Instead of downloading the biometric information for the three John Smiths, in this example embodiment the current biometric information for the subject is uploaded to the biometric matching resource 102. The information transmitted is again about four megabytes, but the transmission occurs only once, and only for the subject; the biometric matching resource 102 already has the prior biometric information for the three John Smiths to which the biometric comparison is to be made.

Here, the function of the hardware processor 260 and the communications unit 270 in access control checkpoint 142 are improved: instead of downloading around 10,000 frames of data, only about 3,000 are uploaded. This improvement is realized in every access control checkpoint 142 whenever a subject must be identified using biometric information.

The function of the computers that operate the network 152 is also improved. In embodiments in which network 152 is a shared resource, such as is the case with the Internet, the possibility of network latency that could occur in the distributed resource approach is largely avoided in the central resource approach.

Biometric matching resource 102, as depicted in FIG. 2, has a processing system that comprises hardware processor 106, and communication unit 104 for transmission and reception of data over network 152. Biometric matching resource 102 additionally includes identity record maintenance logic 108 which updates the identity record set 114 stored in memory 112.

Identity record set 114 includes information from some of the identity records (IRs) in biometric repository 128, in third-party source 122. In various embodiments, the identity records in identity record set 114 represent information about people in the expected subject list and are received from third-party source 122 via an expected subject information message. In embodiments, the records in identity record set 114 are copies of corresponding records in biometric repository 128. In other embodiments, the records in identity record set 114 contain only some of the biographic data, such as only basic biographic information such as name and date of birth, or the like. In embodiments, the records in identity record set 114 include biometric information. In yet other embodiments, the biometric information is populated on an ad hoc basis, in response to a biometric comparison request message, by requesting the biometric information from the third-party source 122 via a biometric information access request. In embodiments, the identity record set 114 is built by the biometric matching resource 102/central resource from identity records 132 that originate from multiple third-party sources 122; in such embodiments, the central resource associates the identity records 132 into respective expected subject lists on a per-checkpoint basis by associating the appropriate records with a particular identity record set 114. The expected subjects list generated by the central resource is sent to a given checkpoint via communication unit 104 in one or several communications collectively referred to as a list transmission message.

Biometric matching resource 102 also comprises biometric information processing logic 116 and biometric information analysis logic 118. In embodiments, biometric information processing logic 116 arranges the current biometric information of a person appearing at an access control checkpoint 142 into the same form as biometric information 136 in identity record 132. For example, if identity record 132 stores the biometric information 136 as permanently-transformed biometric information, then biometric information processing logic 116 likewise transforms the current biometric information as permanently-transformed biometric information. Once the current biometric information and prior biometric information are in the same form, the biometric comparison can take place. As mentioned above, because the biometric information is stored as permanently-transformed biometric information, the information is resistant to use by a malefactor even if it can be obtained.

In other embodiments, the current biometric information obtained by the access control checkpoint 142 is processed into permanently-transformed biometric information before sending the information over network 152. This operation improves the security of the biometric information because the transformation precedes the transport of the data; if a malefactor intercepts the data, it is already in a form that cannot be inverted back to the original without the expenditure of vast computing resources over a very long time.

When the current biometric information and the prior biometric information are arranged in the same format, whether by biometric information processing logic 116 at the biometric matching resource 102 or by similar logic at the access control checkpoint 142, the biometric information analysis logic 118 compares the current biometric information with the prior biometric information. More particularly, the biometric comparison is performed between the current biometric information and the prior biometric information in only the records in a subset of the identity records for which a possible match is determined from the process of biographic disambiguation. When one of the biometric comparisons results in an affirmative result, the person appearing at access control checkpoint 142 is authenticated as being the person they alleged. When none of the biometric comparisons results in an affirmative result, the person is not authenticated by the system 100.

Operating Example A—Rolling Updates to Expected Subjects List

Figure 3:
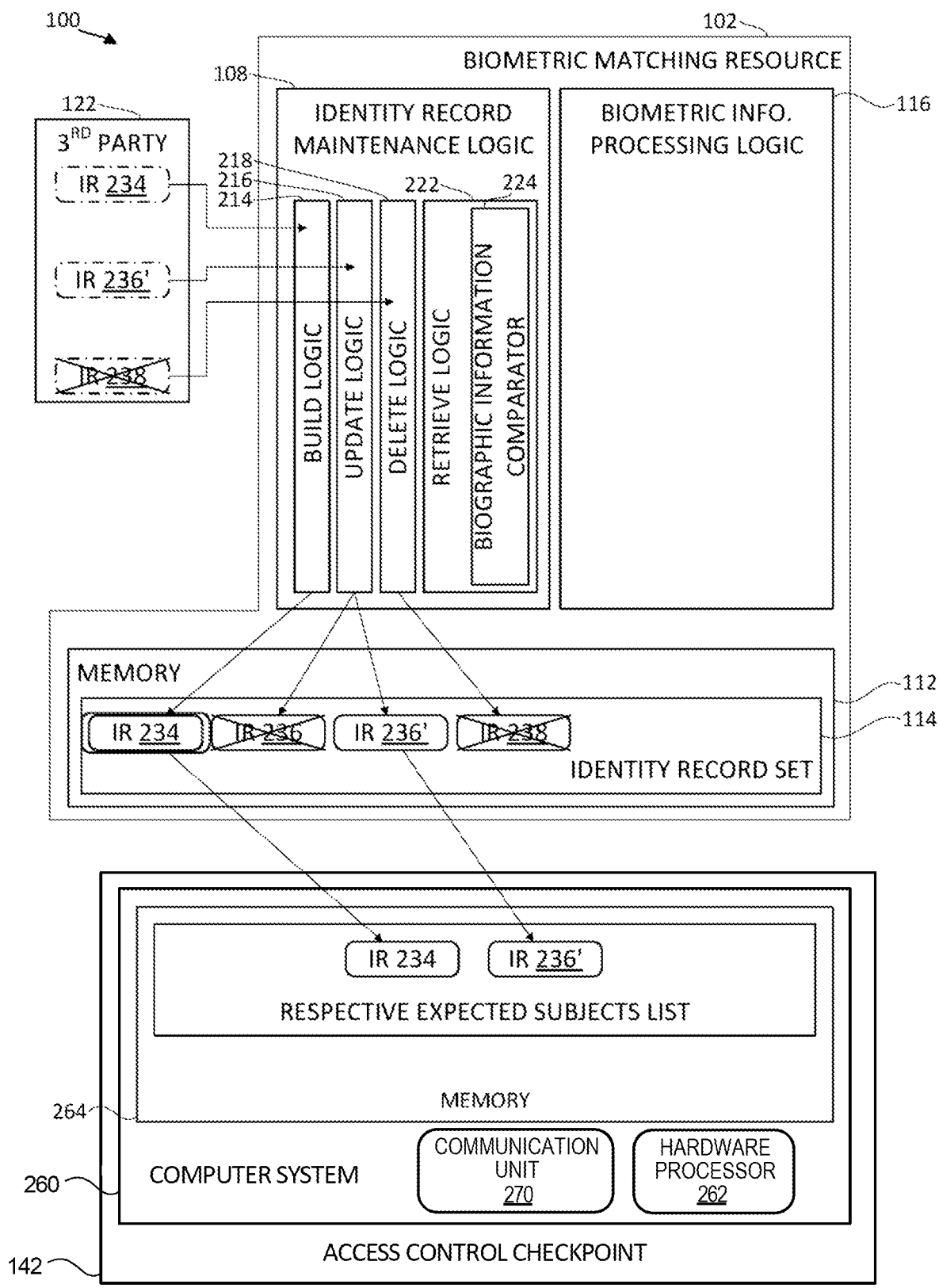
FIG. 3 shows a simplified, schematic view of a computer system that implements rolling updates to a checkpoint's respective list of expected subjects, in accordance with an example embodiment.

FIG. 3 illustrates an operating example of system 100. Biometric matching resource 102 maintains identity record set 114 within memory 112 with identity records 234, 236, 238, received from third-party source 122, as an expected subject list. This list includes only three identity records because it is a teaching example. Furthermore, this expected subjects list is the respective list that is provided to the access control checkpoint 142 shown in FIG. 3 because this teaching example includes only one access control checkpoint 142.

As mentioned previously, in embodiments, a respective expected subjects list at the access control checkpoint 142 achieves a reduction in computing resources because the search space for matches is much smaller than the universe of potential subjects. As also previously mentioned, rolling updates to the expected subjects list yield additional improvements in the functioning of the computer system because updated information is more likely to be correct, reducing the number of operations based on information that is erroneous because it has changed. An embodiment that achieves such rolling updates is now described in this detailed teaching example.

Third-party source 122 in FIG. 3 has received three updates, one update to each of identity records (IRs) 234, 236, 238, but these updates arrived after the time that the expected subject list was prepared from inputs by third-party sources 122 and provided by biometric matching resource 102 to each access control checkpoint 142 as a respective expected subject list. Here, new record 234 is to be added; record 236 has a change and is to be updated to 236'; and record 238 is to be deleted. In the context of air travel, new record 234 could represent a person called to travel on short notice. Updated record 236' could represent the case where a person notices a misspelling in their name and enters a correction. Deleted record 238 could represent a person who cancels a trip at the last minute.

In this example, biometric matching resource 102 uses identity record maintenance logic 108 to effectuate a rolling update to the expected subjects list each time a change occurs, such as the types of changes represented by identity records 234, 236, and 238.

The change information is downloaded from the third-party source 122 to the biometric matching resource 102 in one or more communications referred to, collectively, as an identity record maintenance message. Identity record maintenance logic 108 implements the changes. New record 234 is added to the expected subjects list by build logic 214. Update logic 216 replaces the data of record 236 to the updated data, resulting in the updated record 236'. Delete logic 218 deletes record 238 from the expected subjects list. The updated expected subjects list is subsequently refreshed at the access control checkpoint 142, via communication unit 104, by list update logic 217 (discussed below in relation to FIG. 6).

In an alternative embodiment, the identity record maintenance logic 108 is located at access control checkpoint 142. In this embodiment, the biometric matching resource 102 furnishes the updates received from third-party source 122 directly to the access control checkpoint 142, which then implements the changes locally to its respective expected subjects list.

Operating Example B—Biometric Comparison at Central Resource

In embodiments, a central resource such as biometric matching resource 102 performs the tasks of comparing biometric information, as discussed above. This operating example describes the operation of system 100 in such a case.

Figure 4:
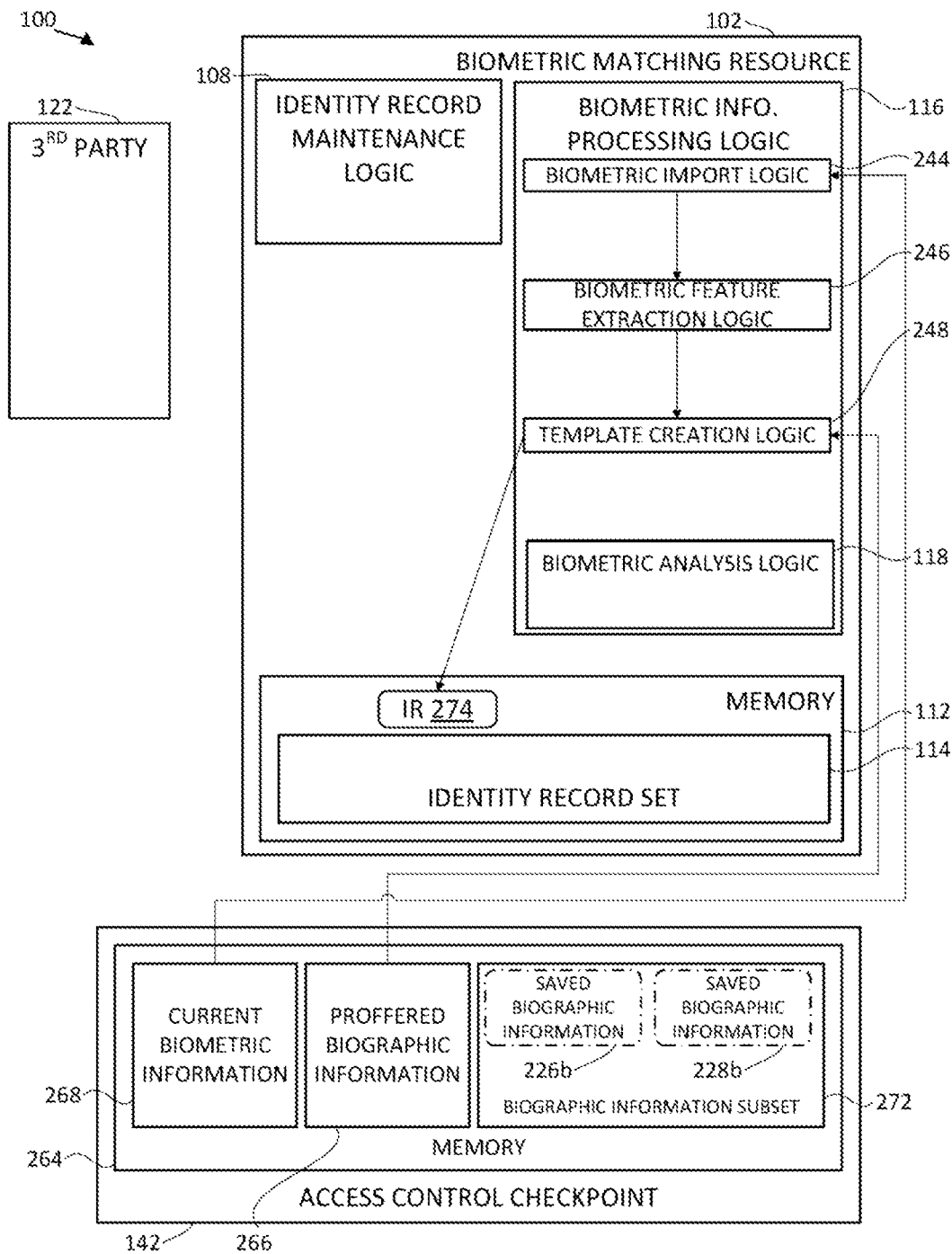
FIG. 4 shows a simplified, schematic view of a computer system that protects biometric information by applying a one-way transform, in accordance with an example embodiment.

Turning now to FIG. 4, a subject is at an access control checkpoint 142. The subject asserts their identity by furnishing proffered biographic information 266. The access control checkpoint 142 collects the subject's current biometric information 268. The access control checkpoint 142 stores the proffered biographic information and the current biometric information in memory 264.

In embodiments, the biometric-credential authentication technology system 144 (see FIG. 2) of access control checkpoint 142 compares the proffered biographic information 266, such as name and date of birth, with saved biographic information contained in the identity records of the expected subjects list.

Depending on the result of this comparison, in embodiments, a subset of the identity records is selected as possible matches. In some circumstances, only one identity record will be selected as a match. This circumstance arises when the match with a given identity record is clear and unambiguous.

In some circumstances, the subset of possible matches will include more than one identity record. This circumstance arises, in an embodiment, when more than identity record having the same name and same date of birth are on the expected subjects list. Several scenarios can account for such a situation. In one scenario, two different people coincidentally have the same name and date of birth and are to pass through the same checkpoint on the same day. In another scenario, one person creates two records of themselves in the systems of third-party source 122, perhaps as a result of a computer glitch or user error. In a third scenario, a given person, uncertain of their plans, makes two sets of plans as a precaution. Other plausible scenarios are possible, including scenarios in which a typographical error or a malefactor plays a role. In these scenarios, the biometric-credential authentication technology system 144 selects more than one identity record (i.e., a plurality of identity records) as a possible match for the proffered biographic information 266.

In FIG. 4, the subset of identity records is shown as biographic information subset 272. These records can contain biometric information in embodiments but in this example, since biometric matching resource 102 performs biometric comparisons, there is no need for biographic information subset 272 to contain any prior biometric information.

Having performed an initial step of biographic disambiguation, the access control checkpoint 142 identifies the biographic information subset 272, which is a subset of records for which a degree of similarity, between the proffered biographic information and the saved biographic information, exceeds a threshold. In this example, biographic information subset 272 includes the saved biographic information of a plurality of identity records (i.e., two records 226b and 228b, denominated with the "b" for biographic).

In this example, following the biographic disambiguation at the access control checkpoint 142, a biometric information analysis is performed at biometric matching resource 102.

In one or more communications, referred to collectively as a biometric comparison request message, access control checkpoint 142 transmits the proffered biographic information 266, current biometric information 268, and biographic information subset 272, containing the saved biographic information of records 226b and 228b, to biometric matching resource 102.

In an embodiment, the biographic information subset 272 includes record identifiers instead of biographic information per se. In this embodiment, recall that the biometric matching resource 102 already has access to this biographic information and was in fact the source of this information that was provided to the access control checkpoint 142. In this embodiment, the saved biographic information is not sent but, instead, only a record identifier that enables biometric matching resource 102 to discern what records are in biographic information subset 272. By not sending the saved biographic information from access control checkpoint 142 to biometric matching resource 102, but only an indication of the saved biographic information, any malefactor who intercepts the communication is denied any opportunity to obtain the saved biographic information. In this embodiment, the biometric comparison request message is free of saved biographic information even though it contains data indicating the saved biographic information (namely, the record indicators).

The biometric comparison request message, therefore, in the embodiment that sends some or all of the saved biographic information for the biographic information subset 272, and likewise in the embodiment that sends only the record indicators for the biographic information subset 272 but is free of the saved biographic information, the message includes at least an indication of the saved biographic information.

In this embodiment, the only biographic information transmitted in the biometric comparison request message is based on the proffered biographic information.

This operating example highlights the improvement in the functioning of the computer system itself If the biometric comparison were to be performed at the access control checkpoint 142, it would be necessary for network 152 to support the transfer of the prior biometric information for both 226 and 228 from the central resource to the checkpoint. Since the biometric comparison is performed at the central resource, however, the network bears only the burden of the current biometric information.

Operating Example C—One-Way Transform of Biometric Information

In an embodiment, a one-way transform function is used to enhance the privacy of individuals and to improve the security of biometric information in case of compromise, as explained above. The one-way transform function, in embodiments, takes biometric information as input and outputs permanently-transformed biometric information.

To that end, biometric import logic 244 inputs the current biometric information 268. A biometric feature extraction logic 246 obtains biometric features from the biometric information imported by biometric import logic 244. The biometric import logic 244 conveys the biometric features to template creation logic 248. The template creation logic 248 generates the permanently-transformed biometric information. The template creation logic 248 receives the proffered biographic information 266 and associates it with the permanently-transformed biometric information to assemble subject identity record 274. The content of subject identity record 274 is based on the proffered biographic information 266 and the current biometric information 268.

In embodiments, the one-way transform function is applied to the current biometric information 268 at the access control checkpoint 142 instead of at the biometric matching resource 102. This alternative ensures that the biometric information is protected from use even if intercepted during transmission to the central resource. In such embodiments, the access control checkpoint 142 transmits the subject identity record 274 to the biometric matching resource 102, which stores it in memory 112.

Operating Example D—Biometric Comparison

Figure 5:
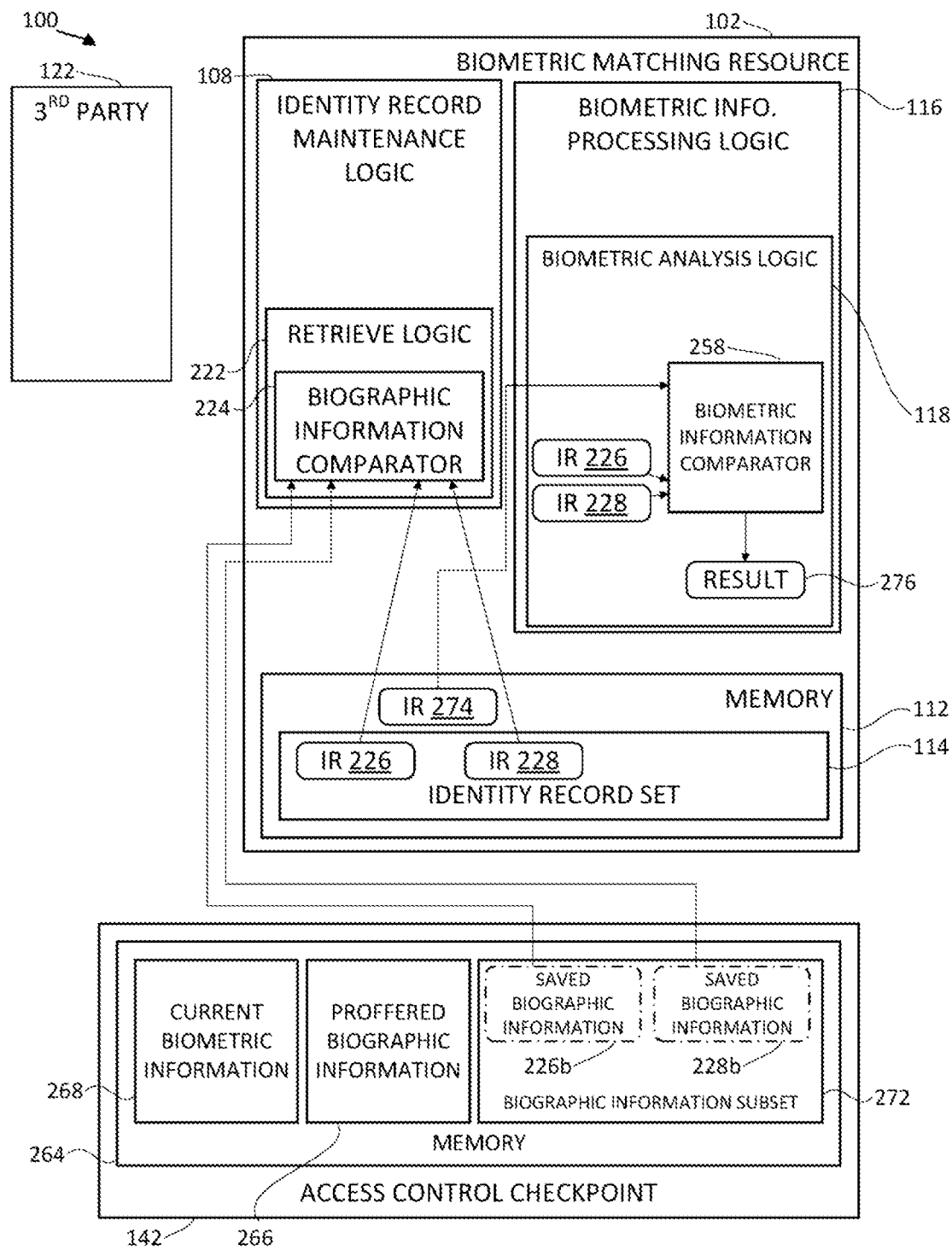
FIG. 5 shows a simplified, schematic view of a computer system that performs biometric comparisons at a central resource, in accordance with an example embodiment.

Turning now to FIG. 5, saved biographic information 226b and 228b is received at retrieve logic 222. The retrieve logic 222 supplies the saved biographic information 226b and 228b to biographic information comparator 224. Biographic information comparator 224, in an embodiment, compares the saved biographic information in 226b and 228b with records in the identity record set 114 and identifies the corresponding, complete identity records 226 and 228 which contain the same saved biographic information and also the prior biometric information. Retrieve logic 222 obtains these identity records and relays them to biometric information comparator 258.

Biometric information comparator 258 analyzes the respective, prior biometric information in identity records 226 and 228 and compares it with the biometric information in subject identity record 274. In other words, a biometric comparison is performed between the current biometric information in record 274 and the prior biometric information in record 226, and also a biometric comparison is performed between the current biometric information in record 274 and the prior biometric information in record 228.

When a biometric comparison is performed, a degree of similarity is computed. Here, two comparisons are performed: comparison C1 between records 274 and 226, and comparison C2 between records 274 and 228. Here, only two potential matched identities resulted, but it is possible that more than two potential matches will exist, depending on the subject.

The degree of similarity resulting from these comparisons is represented, for example, by DI (for the degree of similarity in comparison C1) and D2 (for comparison C2). The degrees of similarity DI and D2 are compared with a predetermined threshold T. When both DI and D2 exceed the threshold T, then the comparison having the highest degree of similarity is taken as indicating the matching identity.

In any event, a result 276 is returned. The result, in embodiments, indicates the record having the highest degree of similarity, and whether the degree of similarity exceeded the predetermined threshold T. The result 276 is provided, via the communication unit 104, to the access control checkpoint 142 as a biometric comparison result message.

In embodiments, the biometric matching resource 102 transmits result 276 to access control checkpoint 142. In embodiments, based on result 276, access control checkpoint 142 controls an electronic access control device to perform a pre-programmed function such as activating an access control device.

Operating Example E—Record Locking

In this operating example an improvement in the functioning of the computer system itself resides in locking the records of subjects whose identity is fixed.

Figure 6:
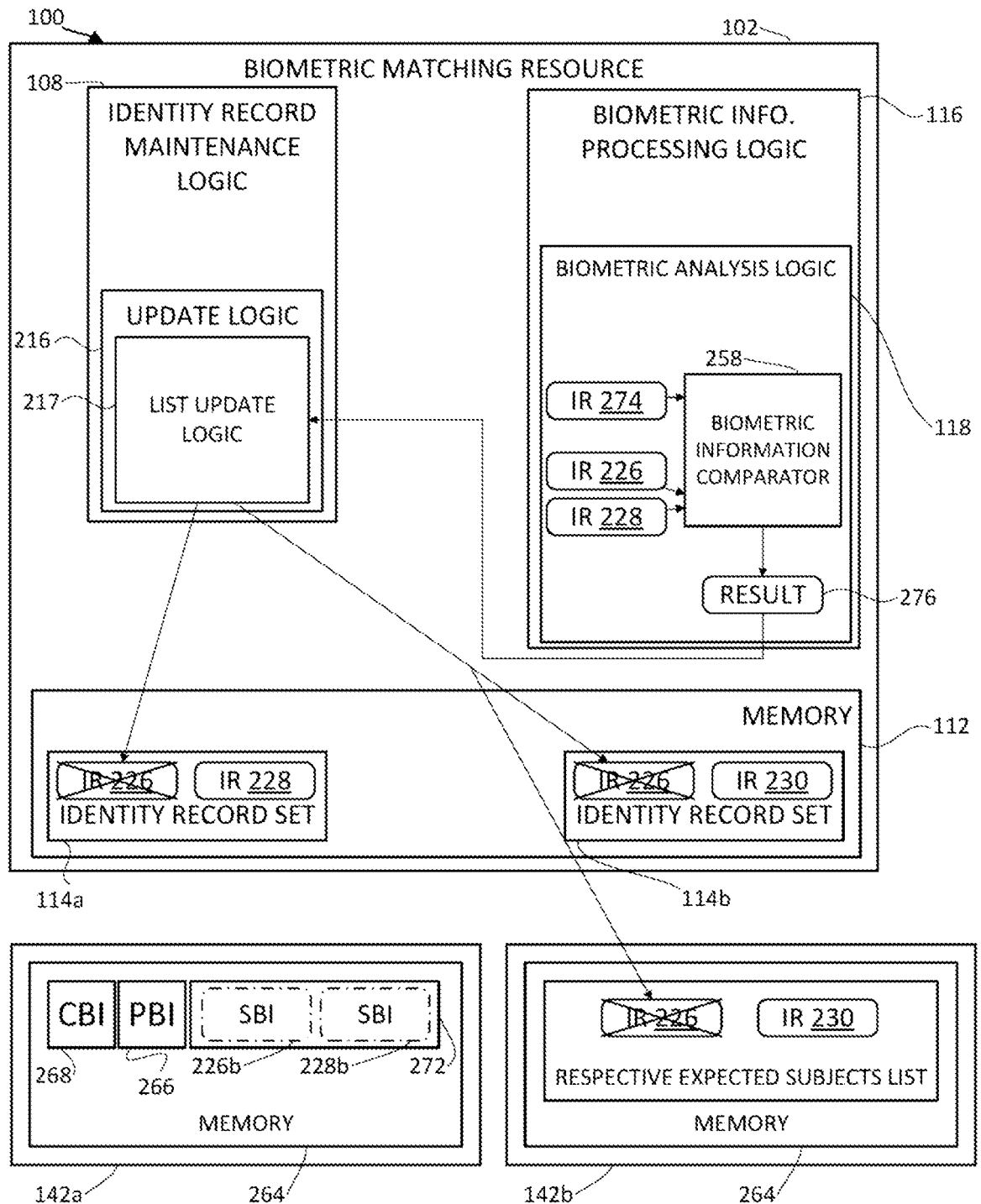
FIG. 6 shows a simplified, schematic view of a computer system that employs record locking, in accordance with an example embodiment.

FIG. 6 is similar to FIG. 5, except that now two access control checkpoints 142 are illustrated: 142a and 142b. The operation in FIG. 6 resumes where that of FIG. 5 concluded, and for the subject at access control checkpoint 142a, the biometric analysis result 276 has been reached. Here, the conclusion is that the subject at the checkpoint matches identity record 226.

In addition to the validation of the subject's identity at access control checkpoint 142a, the identity record 226 is locked. The result 276 is provided to list update logic 217 of update logic 216.

The list update logic 217 updates the identity record set 114a. The identity record set 114a in this example represents the expected subjects list for access control checkpoint 142a. The change is made, using a list transmission message, as a rolling update to the respective expected subjects list at access control checkpoint 142a. Identity record 226 is no longer a candidate for any matching operation at access control checkpoint 142a.

The list update logic 217 also updates the identity record set 114 for every other checkpoint including, as shown, identity record set 114b that is the expected subjects list for access control checkpoint 142b. The identity record set 114b is updated in a way that prevents identity record 226 from being a match at access control checkpoint 142b. In an embodiment, the update is communicated in a record lock message.

Record locking, as shown, prevents the duplicate use of the same identity by two different people. It also makes the biographic disambiguation more efficient. Consider the situation at access control checkpoint 142b. Without record locking, the respective expected subjects list included identity record 226. With record locking, the list is shortened. The shorter list requires less processing to search during biographic disambiguation. The biographic information subset 272, when generated, can no longer include identity record 226. Depending on the situation, this can eliminate the need to perform a biometric comparison at biometric matching resource 102.

Therefore, every biographic disambiguation operation benefits by eliminating from the biographic comparison to data in any locked records, leading to a reduction in the expenditure of CPU cycles, to less use of memory, and demonstrates an improved technical function in the computer system 260 at access control checkpoint 142. Some biometric comparisons are eliminated by the record locking, leading to a reduction of use of the same computing resources, and a demonstrated improvement in the technical function of the computer system at biometric matching resource 102. It follows that record locking leads to an improvement in the aggregate computer system 100.

Record locking, in embodiments, is implemented for a given duration of time. For example, when a subject appears at access control checkpoint 142a and proves their identity to be that corresponding to identity record 226, the record is locked for the time during which the subject is expected to be in flight. In such embodiments, the identity record that is locked is monitored by record locking logic (not shown) included in identity record maintenance logic 108.

The list update logic 217 notifies the record locking logic whenever an update to the identity record set 114 is made. The record locking logic records which identity record is impacted. The record locking logic determines the duration of the lock. In such embodiments, the record lock message includes not only an indication of an identity record, but also a locking duration. The manner in which the record locking logic makes this determination depends on the context. In the context of air travel, in one embodiment, the record locking logic locks the record for the expected duration of the relevant flight. In an embodiment, the record locking logic sets an unlock date and time that considers the duration of the lock. The record locking logic monitors the current date and time, and when an unlock date and time occurs, the record locking logic unlocks the locked record. Once unlocked, the identity record is once again eligible for matching as part of the relevant identity record sets 114 and as part of the expected subjects lists. In other embodiments, the record locking logic determines an unlock event instead of an unlock time. For example, the event is the landing of a plane on which the subject has been a passenger. Together, the unlock date and time and the unlock event are examples of unlock criteria.

CONCLUSION

This description provides a number of examples or embodiments of the present invention. The present invention provides many applicable inventive concepts that can be embodied in a wide variety of ways. The exemplary embodiments discussed herein are merely illustrative of ways to make and use the invention and are not intended to limit the scope of the invention. Rather, the teachings and disclosures herein can be combined or rearranged with other portions of this disclosure.

What is claimed is:

1. A method for reducing network and processing burden on a computer system of an access control checkpoint, in biographic disambiguation in access control, the method comprising:

storing, in an access control memory of a computer system of an access control checkpoint, a set of access control identity records, the access control identity records including biographic information;

responsive to receiving a biometric information of a person and, associated with the biometric information of the person, a proffered biographic information of the person:

accessing the access control memory, and comparing the proffered biographic information to the access control identity records and, in response to a result of the comparing indicating a subset of more than one of the access control identity records having biographic information having a degree of similarity to the proffered biographic information that exceeds a threshold:

generating and sending, via a network, to a central resource computer system, a biometric comparison request message that includes the proffered biographic information of the person, an indication of the biometric information of the person, and an indication of biographic information in the access control identity records in the subset, receiving from the central resource computer system a response to the biometric comparison request message, the response indicating whether a central resource identity record includes both a matching identity record biographic information and a matching identity record biometric information, the matching identity record biographic information matching any among the proffered biographic information and biographic information indicated by the indication of biographic information in the access control identity records in the subset, and the matching identity record biometric information matching the biometric information indicated by the indication of biometric information in the biometric comparison request message.

2. The method of claim 1, further comprising:
extracting, by the computer system of the access control checkpoint, features from the proffered biographic information of the person; and
creating, by the computer system of the access control checkpoint, a template representative of the biographic information of the person based on the features.

3. The method of claim 2, further comprising: the template being in a format of a template respectively representative of the subset being one identity record.

4. The method of claim 2, further comprising the creating being configured such that a restoring of the template to the biographic information is not computationally feasible.

5. The method of claim 1, further comprising:
the computer system of the access control checkpoint performing a pre-programmed control of an electronic access control device, according to a biometric comparison.

6. The method of claim 1, further comprising:
the computer system of the access control checkpoint storing, for the access control identity records in the set of access control identity records, respective record identifiers; and
the biometric comparison request message including, as the indication of biographic information in the access control identity records in the subset, record identifiers of access control identity records in the subset.

7. The method of claim 1, further comprising:
the computer system of the access control checkpoint performing a one-way transform of the biometric information of the person and generating a corresponding one-way transformed biometric information of the person, and
the indication of the biometric information of the person being the one-way transformed biometric information of the person.

8. The method of claim 1, further comprising:
the computer system of the access control checkpoint receiving from the central resource computer system an expected subject list, the expected subjects list being access control identity records of individuals expected to pass through the access control checkpoint within a window of time; and
the computer system of the access control checkpoint storing, in the access control memory, as the set of access control identity records, the expected subject list as a stored expected subjects list.

9. The method of claim 8, further comprising:
the central resource computer system receiving, from a third-party source, an update information regarding the expected subjects list and, in response sending, to the computer system of the access control checkpoint, a list transmission message, via the network; and
the computer system of the access control checkpoint, in response to receiving the one or more list transmission messages, updating the stored expected subjects list.

10. The method of claim 8, further comprising:
the central resource computer system receiving, from a third-party source, an expected subjects update information and, in response, sending the expected subjects update information to the computer system of the access control checkpoint, via the network; and
the computer system of the access control checkpoint, in response to receiving the expected subjects update information, updating the stored expected subjects list.

11. A computer system, for reduced network and processing burden biographic disambiguation, comprising:
an access control checkpoint computer system, of an access control checkpoint, comprising a hardware processor, an access control memory, and a communication unit, adapted to communicate via a network with a central resource computer system, the access control checkpoint computer system further comprising:
the hardware processor being configured to access the access control memory and to perform a predefined set of basic operations by loading corresponding ones of a predefined native instruction set of codes, the predefined native instruction set of codes, constituting a set of instructions selectable for execution by the hardware processor,
biometric-credential authentication technology system, stored in the access control memory, comprising a respective sequence of instructions selected from the predefined native instruction set of codes of the hardware processor, adapted to:
manage, in the access control memory, a set of access control identity records, the access control identity records including biographic information;
responsive to receiving a biometric information of a person and a proffered biographic information of the person, to access the access control memory, and
compare the proffered biographic information to the access control identity records and, in response to a result of the compare indicating a subset of more than one of the access control identity records having biographic information having a degree of similarity to the proffered biographic information that exceeds a threshold, to
generate and send, via the network, to the central resource computer system, a biometric comparison request message that includes the proffered biographic information of the person, an indication of the biometric information of the person, and an indication of biographic information in the access control identity records in the subset,
receive from the central resource computer system, via the network, an indication of whether a central resource identity record includes both a matching identity record biographic information and a matching identity record biometric information, the matching identity record biographic information matching any among the proffered biographic information and biographic information indicated by the indication of biographic information in the access control identity records in the subset, and the matching identity record biometric information matching the biometric information indicated by the indication of biometric information in the biometric comparison request message.

12. The system of claim 11, further comprising the biometric-credential authentication technology system being further configured to cause the hardware processor of the access control checkpoint computer system to
extract features from the proffered biographic information of the person; and
create a template representative of the biographic information of the person based on the features.

13. The system of claim 12, further comprising the template being configured such that a restoring of the template to the biographic information is not computationally feasible.

14. The system of claim 11, further comprising:
an electronic access control device, communicatively coupled to the computer system of the access control checkpoint; and
the biometric-credential authentication technology system being further configured to cause the hardware processor to:
cooperatively operate with a third-party computer system, or a central resource computer system, or both, to perform a validation of a person, using a current biometric information of the person and a proffered biographic information of the person, and
based upon a result of the validation, to transmits a control signal to the electronic access control device.

15. The system of claim 11, further comprising the biometric-credential authentication technology system being further configured to:
store, for the access control identity records in the set of access control identity records, record identifiers; and
to configure the biometric comparison request message to include, as the indication of biographic information in the identity records, indications of the record identifiers of the access control identity records in the subset.

16. The system of claim 11, further comprising the biometric-credential authentication technology system being further configured to:
perform a one-way transform of the biometric information of the person and generate a corresponding one-way transformed biometric information of the person, and
configure the indication of the biometric information of the person as being the one-way transformed biometric information of the person.

17. The system of claim 11, further comprising, stored in the access control memory, an identity record maintenance logic, configured to:
cause the computer system of the access control checkpoint, upon receiving from the central resource computer system an expected subject list, the expected subjects list being access control identity records of individuals expected to pass through the access control checkpoint within a window of time, to
store, in the access control memory, as the set of access control identity records, the expected subject list as a stored expected subjects list.

18. The system of claim 17, further comprising:
a computer system of the central resource computer system receiving, from a third-party source, an update information regarding the expected subjects list and, in response sending a list transmission message to the computer system of the access control checkpoint, via the network; and
the computer system of the access control checkpoint, in response to receiving the list transmission message, updating the stored expected subjects list.

19. A computerized method for reduced computational burden disambiguation, comprising:
storing in a memory of a computer system of an access control checkpoint, a set of biographic information identity records, having respective saved biographic information;
receiving, from an individual at the access control checkpoint a proffered biographic information;
comparing the proffered biographic information to the respective saved biographic information in the set of biographic information identity records, and generating a comparison result;
selecting, as a selected next operation, among a first next operation, a second next operations, and a third next operation, based on the comparison result,
the first next operation being a determination of no match, the second next operations being a biometric matching against a prior biometric information corresponding to one person, and the third next operation being a biographic disambiguation,
the selecting including:
selecting the first next operations in response to the comparison result indicating the proffered biographic information matches no saved biometric information
selecting the second next operation in response to the comparison result indicating the proffered biographic information matches only one saved biometric information with a degree of similarity exceeding a threshold, and
selecting the third next operation in response to the comparison result indicating the proffered biographic information matches more than one saved biographic information with a degree exceeding the threshold;
performing the selected next operation; and
repeating the receiving, comparing, selecting, and performing until all among the first next operations, second next operation, and third next operation have been selected and performed.

20. The computerized method of claim 19, further comprising the third next operation including:
identifying a subset, the subset being biographic information identity records having respective saved biographic information that matches the proffered biographic information by a degree exceeding the threshold;
generating and sending, via a network, to a central resource computer system, a biometric comparison request message that includes the proffered biographic information of the person, an indication of the biometric information of the person, and an indication of biographic information in the biographic information identity records in the subset,
receiving from the central resource computer system a response to the biometric comparison request message, the response indicating whether a central resource identity record includes both a matching identity record biographic information and a matching identity record biometric information, the matching identity record biographic information matching any among the proffered biographic information in the biometric comparison request message and biographic information indicated by the indication of biographic information in the biographic information identity records in the subset, and the matching identity record biometric information matching the biometric information indicated by the indication of biometric information in the biometric comparison request message.

\* \* \* \* \*